United States Patent
Vora et al.

(10) Patent No.: US 10,609,140 B2
(45) Date of Patent: Mar. 31, 2020

(54) DYNAMIC RESOURCE MANAGEMENT SYSTEMS AND METHODS

(71) Applicant: salesforce.com, inc., San Francisco, CA (US)

(72) Inventors: Darshil Vipul Vora, San Francisco, CA (US); Youngjun Kwak, San Francisco, CA (US); Alan Dawkuan Hwang, San Francisco, CA (US); Alex Mastrodonato, San Francisco, CA (US); Paul Korpi, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 109 days.

(21) Appl. No.: 15/688,759

(22) Filed: Aug. 28, 2017

(65) Prior Publication Data

US 2019/0068703 A1 Feb. 28, 2019

(51) Int. Cl.
*G06F 15/16* (2006.01)
*H04L 29/08* (2006.01)
*G06F 16/178* (2019.01)
*G06F 16/93* (2019.01)

(52) U.S. Cl.
CPC ........ *H04L 67/1095* (2013.01); *G06F 16/178* (2019.01); *G06F 16/94* (2019.01); *H04L 67/1097* (2013.01); *H04L 67/34* (2013.01); *H04L 67/02* (2013.01); *H04L 67/06* (2013.01)

(58) Field of Classification Search
CPC .... H04L 67/1095; H04L 67/34; G06F 16/178

USPC .......................................................... 709/203
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Sm A Rahman
(74) *Attorney, Agent, or Firm* — LKGlobal | Lorenz & Kopf, LLP

(57) ABSTRACT

Computing systems, database systems, and related methods are provided for supporting dynamic resources. One exemplary method involves a resource server identifying a reference to an external source within a resource obtained from a resource database, retrieving data residing at the external source from a network using the reference, and generating a graphical representation of the resource at a client device communicatively coupled to the network. The graphical representation of the resource includes a graphical representation of the retrieved data at a location within the graphical representation of the resource corresponding to a location of the reference within the resource.

17 Claims, 8 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,639,943 B1 * | 12/2009 | Kalajan .............. G03B 29/00 396/429 |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0244977 A1 * | 10/2007 | Atkins ................ G06Q 10/107 709/206 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0276771 A1 * | 11/2009 | Nickolov ............. G06F 9/4856 717/177 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0271557 A1 * | 9/2015 | Tabe ................ H04N 21/4788 725/14 |

* cited by examiner

FIG. 5

DYNAMIC RESOURCE MANAGEMENT SYSTEMS AND METHODS

TECHNICAL FIELD

Embodiments of the subject matter described herein relate generally to database systems, and more particularly, to methods and systems that support dynamic documents, files, or other resources in a database system.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Cloud-based architectures and file hosting services have been developed to improve collaboration, integration, and cooperation among users. However, editing and updating files often remains a manually intensive task that can be prone to duplicate efforts, such as, for example, entering information in multiple locations, copying and pasting information, and the like. Additionally, over time, as information becomes stale, users may have to manually inspect and update files accordingly and manage multiple different versions of a given file. Accordingly, it is desirable to provide methods and systems for managing files in a more automated manner that reduces the time and effort required by individual users.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 4-8 depict an exemplary sequence of graphical user interface (GUI) displays illustrating the visualization process of FIG. 2 in accordance with one or more exemplary embodiments.

DETAILED DESCRIPTION

Figure 1:
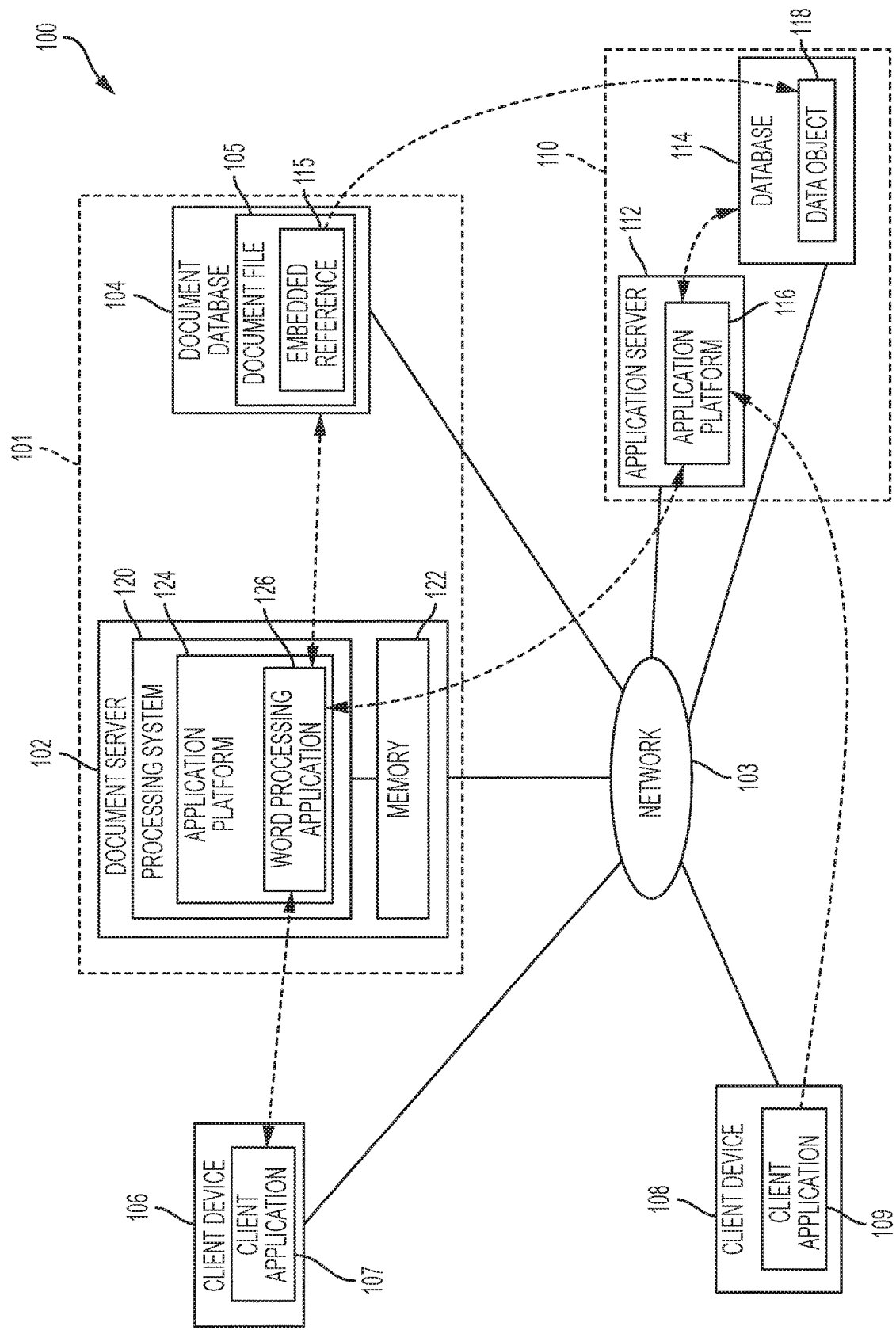
FIG. 1 is a block diagram of an exemplary computing system.

Embodiments of the subject matter described herein generally relate to methods and systems for managing dynamic electronic files or other resources that include references to data or information from other sources external to the particular file or resource. For purposes of explanation, the subject matter may be described herein in the context of electronic document files; however, the subject matter is not limited to electronic document files and may be employed in an equivalent manner for other types of electronic files (e.g., spreadsheet files, and the like). In exemplary embodiments, a reference to a location associated with an external source is embedded, inserted, or otherwise provided within a body or payload of the electronic file. Data or information residing at that location is retrieved from that location at the external source and incorporated into a graphical representation of the electronic file at a location within the body that corresponds to the location of the reference within the body. In this regard, when the data or information at that referenced location is updated at the external source, the graphical representation of the electronic file may be dynamically updated to automatically reflect the current data or information residing at the referenced location at the external source. Thus, users do not need to update the body of the electronic file directly by manually copying, transposing, or otherwise manipulating the electronic file.

In one or more embodiments, a document management system includes a document server coupled to a document database that stores or otherwise maintains data for generating graphical representations of electronic document files within instances of a word processing application provided to client computing devices. When a user of a client device indicates a desire to open or view a document within the word processing application, the document server obtains the document data from the document database and generates or otherwise provides a graphical representation of the document on the client device within the word processing application. In this regard, when generating the visualization of the document, the document server identifies any references to external sources within the document and retrieves data from those external sources that resides at locations indicated by the references. Accordingly, the graphical representation of the document includes graphical representations of document data stored at the document database with graphical representations of the external data interposed at locations within the document data at locations corresponding to the locations of the external references within the document data.

As described in greater detail below, when the external data residing at the referenced locations at the external sources is changed, modified, or otherwise updated, the document server dynamically updates the graphical representations of the external data to reflect the updated data at those referenced external locations. Thus, the depicted document is essentially a "living" or "dynamic" document that automatically changes or updates over time as external data changes, as opposed to static documents that require manual editing and updating.

FIG. 1 depicts an exemplary embodiment of a computing system 100 that includes a resource management system 101 capable of supporting dynamic resources 105 for presentation to a user of a client device 106 within an instance of a resource visualization application 126 provided by a resource server 102. The resource server 102 is communicatively coupled to a resource database 104 that stores or otherwise maintains the data corresponding to the resources to be accessed. For purposes of explanation, the subject matter is described herein in the context of the resources as being realized as electronic document files (or simply documents); however, it should be appreciated the subject matter described herein is not limited to documents and may be implemented in an equivalent manner for spreadsheets, presentations, or many other types of electronic files. That said, for purposes of explanation, the resource management system 101 is alternatively referred to herein as a document management system, the resource server 102 is alternatively referred to herein as a document server, and the resource database 104 is alternatively referred to herein as a document database.

In exemplary embodiments, the client device 106 is communicatively coupled to the document server 102 via a communications network 103, may be realized as any sort or combination of wired and/or wireless computer network, a cellular network, a mobile broadband network, a radio network, the Internet, or the like. In exemplary embodiments, a document file database object 105 includes a reference 115 embedded within the body or payload of the document 105 that identifies an external location associated with a source 110 accessible via the network 103 where content to be integrated or incorporated into the document resides. The source 110 is logically distinct or different from the document server 102 or the document database 104, and accordingly, may alternatively be referred to as an external source. In this regard, the external source 110 could be operated by the same administrator or operator of the document server 102 or a third-party.

In exemplary embodiments, the embedded reference 115 is realized as a direct link to or query for data or content at a particular location at the external source 110. Exemplary embodiments are described herein in the context of the external source 110 being realized as a database system, where the embedded reference 115 is realized as a query statement that refers to a specific field of a database object 118 stored or maintained in another database 114, and the query statement 115 is utilized to retrieve data or content from that field of the database object 118 via a server 112 of the database system 110. However, it should be appreciated that the subject matter described herein is not necessarily limited to any particular type of external source 110 or reference 115, and in alternative embodiments, the embedded reference 115 could include or otherwise be realized as a hyperlink, an Internet Protocol (IP) address, or other address suitable for retrieving data via a network 103.

In the illustrated embodiment, the database system 110 includes an application server 112 including an application platform 116 that provides instances of a virtual application to one or more users of other client devices 108 that allow the user(s) to interact with the database object 118 in the database 114 via the application server 112. In this regard, a user of the client device 108 may modify data at the referenced location of the database object 118 (e.g., a field of the database object 118 corresponding to the embedded reference 115) via the application server 112, either between instances of the document 105 being presented on the client device 106 or while the document 105 is presented on the client device 106. Accordingly, after the data at the referenced location of the database object 118 is modified, the updated data propagates through the computing system 100 to dynamically update the visualization of the document 105 provided on the client device 106 via the application server 112 and the embedded reference 115, as described in greater detail below in the context of FIG. 2.

Still referring to FIG. 1, the document server 102 generally represents a computing device, computing system or another combination of processing logic, circuitry, hardware, and/or other components configured to support the resource visualization processes, tasks, operations, and/or functions described herein. In this regard, the document server 102 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the embodiment, the memory 122 may be realized as a random access memory (RAM), read only memory (ROM), flash memory, magnetic or optical mass storage, or any other suitable non-transitory short or long term data storage or other computer-readable media, and/or any suitable combination thereof.

In one or more embodiments, the programming instructions cause the processing system 120 to create, generate, or otherwise facilitate the application platform 124 that generates or otherwise provides instances of a resource visualization application 126 at run-time (or "on-demand") based at least in part upon code and other data that is stored or otherwise maintained by the memory 122 and/or the database 104. For example, in one or more embodiments, the resource visualization application 126 can be realized as a word processing application that supports the visualization processes and related tasks, operations, and/or functions described herein. That said, in other embodiments, the resource visualization application 126 can be realized as a presentation application, a spreadsheet application, or the like. Moreover, in some embodiments, the resource visualization application 126 may support editing multiple different types of documents. For purposes of explanation, but without limitation, the resource visualization application 126 may alternatively be referred to herein as a word processing application.

The client device 106 generally represents an electronic device coupled to the network 103 that may be utilized by a user to access the application platform 124 on the document server 102 and utilize the word processing application 126 to create, retrieve, view, and/or edit electronic document files 105 from the document database 104 via the network 103. In practice, the client device 106 can be realized as any sort of personal computer, mobile telephone, tablet or other network-enabled electronic device. In exemplary embodiments, the client device 106 includes a display device, such as a monitor, screen, or another conventional electronic display, capable of graphically presenting data and/or information provided by the application platform 124 along with a user input device, such as a touchscreen, a touch panel, a mouse, a joystick, a directional pad, a motion sensor, or the like, capable of receiving input from the user of the client device 106. The illustrated client device 106 executes or otherwise supports a client application 107 that communicates with the application platform 124 on the document server 102 using a networking protocol. In some embodiments, the client application 107 is realized as a web browser or similar local client application executed by the client device 106 that contacts the document server 102 and/or application platform 124 using a networking protocol, such as the hypertext transport protocol (HTTP) or the like, to access or otherwise initiate an instance of the word processing application 126 presented on the client device 106.

In exemplary embodiments, the document database 104 stores or otherwise maintains electronic document files 105 for viewing or editing with the word processing application 126. In one or more embodiments, the electronic document files 105 are maintained using document objects maintained in a database table having rows or entries corresponding to respective instances of documents and fields or columns containing the data associated with a respective document. For example, an entry for a document may include a field or column that includes or references the text or other content of the document along with additional fields or columns that maintain other attributes or metadata associated with a particular document, such as, for example, author information, versioning information, and the like.

When a user of the client device 106 selects a document 105 for presentation, the word processing application 126 retrieves the body or content portion of the document 105 from the appropriate field or column of the entry corresponding to that document 105 and generates a word processor graphical user interface (GUI) display within the client application 107 on the client device 106 that includes a graphical representation of the text of the document 105. As described above and in greater detail below, the body of a document 105 includes a reference 115 inserted or embedded within the text of the document 105 that is utilized by the word processing application 126 to retrieve and incorporate data from an external source 110 at that location within the text.

Figure 6:
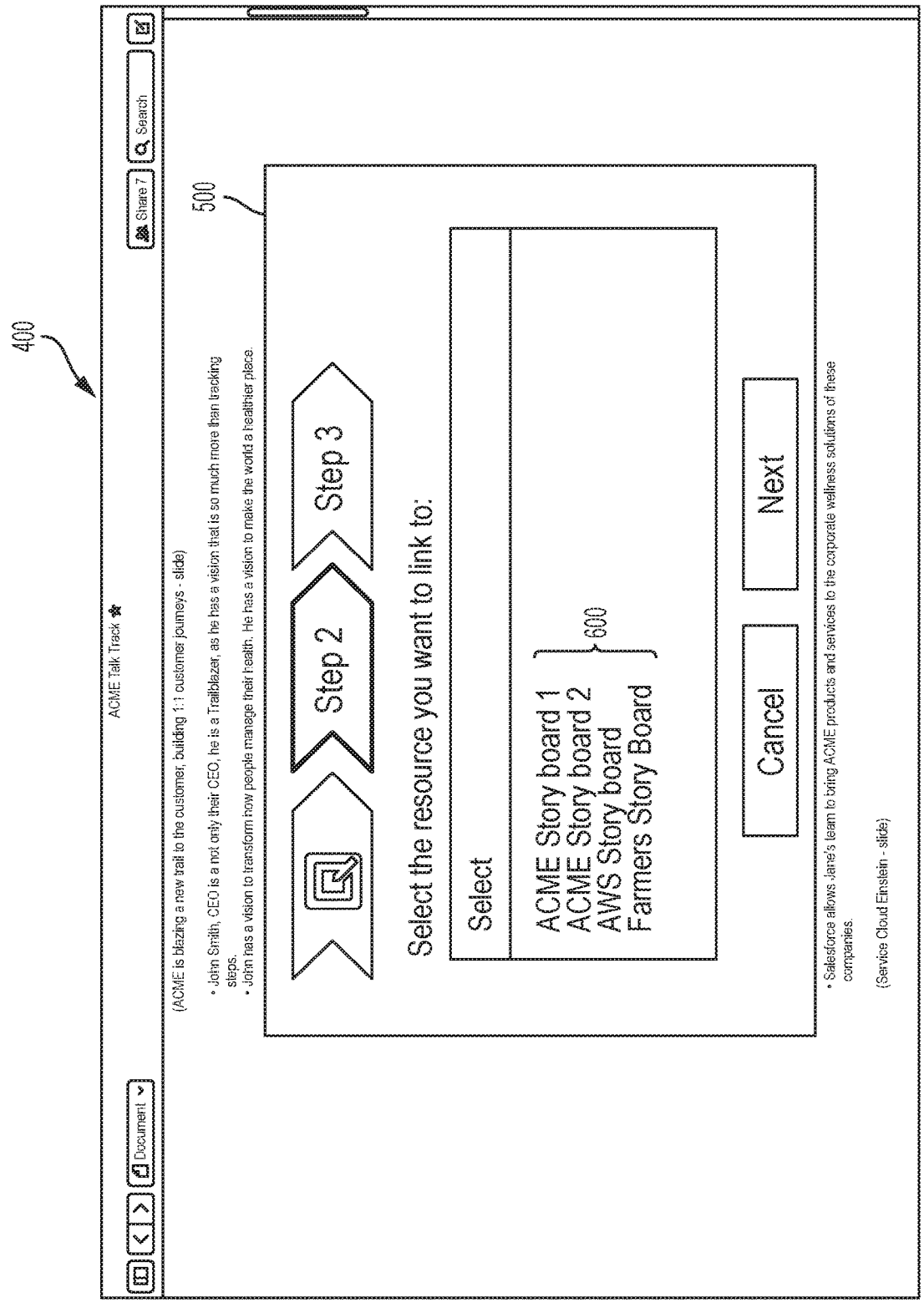

Still referring to FIG. 1, and as described in greater detail below in the context of FIG. 6, in accordance with one or more embodiments, the external source 110 is realized as a database system including an application server 112 and a database 114. The application server 112 generally represents a computing device, computing system or another combination of processing logic, circuitry, hardware, and/or other components configured to support the subject matter described herein. Similar to the document server 102, the application server 112 includes a processing system and a data storage element (or memory). The processing system and memory (e.g., using the programming instructions stored thereon) are cooperatively configurable to cause processing system to create, generate, or otherwise facilitate an application platform 116 that generates or otherwise provides instances of a virtual application at run-time (or "on-demand") based at least in part upon code and other data that is stored or otherwise maintained by the database 114.

The database 114 stores or otherwise maintains data for integration with or invocation by a virtual application in objects organized in various object tables. For example, the database 114 may include a plurality of different object tables configurable to store or otherwise maintain alphanumeric values, metadata, or other descriptive information that define a particular instance of a respective type of object associated with a respective object table. The virtual application may support a number of different types of objects that may be incorporated into or otherwise depicted or manipulated by the virtual application, with each different type of object having a corresponding object table that includes columns or fields corresponding to the different parameters or criteria that define a particular instance of that object.

A user may utilize a client application 109 on the client device 108, such as a web browser or similar local client application, to contact the application server 112 and access or otherwise initiate an instance of a virtual application supported by the application platform 116 on the client device 108. The user of the client device 108 may then utilize the virtual application to edit or modify data for one or more fields associated with an object 118 in the database 114. Thus, one user could be utilizing the client device 108 to manipulate values or other data associated with a referenced field of a database object 118 while a different user is concurrently utilizing a different client device 106 to view or edit a document 105 that includes a reference 115 to that field of the database object 118.

In one or more exemplary embodiments, the word processing application 126 and/or the application platform 124 includes or otherwise supports periodically polling or monitoring referenced locations on the network 103 to identify updates or changes to the data at the referenced location and dynamically update the visualization of the document 105 on the client device 106. For example, one or more of the application platforms 116, 124 may support an application programming interface (API) or similar process that enables the word processing application 126 to be notified of changes to data at a referenced location in the database 114. In some embodiments, the word processor GUI display may include a button, checkbox or similar GUI element that is selectable to selectively enable or disable syncing the presentation of the external document content of document 105 with the corresponding locations at the external sources 110 from where the external document content was obtained. When syncing the document 105 to the external sources 110 is enabled, the word processing application 126 and/or the application platform 124 may periodically poll or otherwise refresh the external sources 110 for the depicted external document content with a frequency or refresh chosen such that the depicted external document content can be automatically updated substantially in real-time in response to changes to the data at the locations at the external sources 110 associated with the depicted external document content. Otherwise, when syncing the document 105 to the external sources 110 is disabled, the word processing application 126 and/or the application platform 124 may refrain from polling the external sources 110.

In one or more embodiments, whenever the word processor GUI display at the client device 106 scrolls within the GUI display to modify the on screen location of the referenced content from the external source 110, the word processing application 126 polls the external source 110 to determine whether the data at the referenced location has been changed prior to updating the GUI display to reflect the scrolling. In other embodiments, the word processor GUI display may include a button or similar GUI element that can be selected to refresh or update the displayed document, and thereby enable a user input to the word processing application 126 that manually initiates updating any references 115 within the document 105. Thus, after a user of the client device 108 modifies a field of a database object 118 in the database 114 via the application platform 116, the word processing application 126 may identify the change to the field (either by polling the application platform 116 or the application platform 116 pushing a notification), automatically retrieve the updated data at the referenced field of the database object 118, and dynamically update the content displayed at the location of the reference 115 within the surrounding text depicted in the word processor GUI display at the client device 106.

Figure 2:
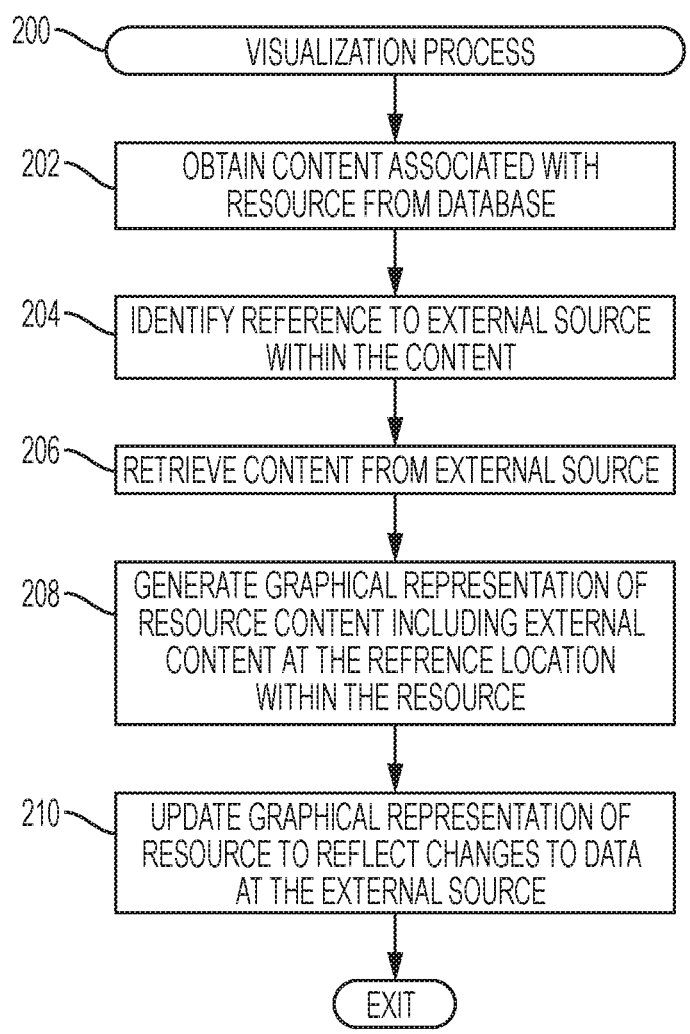
FIG. 2 is a flow diagram of an exemplary visualization process suitable for implementation in the computing system of FIG. 1 in accordance with one or more embodiments.

FIG. 2 depicts an exemplary embodiment of a resource visualization process 200 suitable for implementation in a computing system to enable dynamically updating resources and/or resource visualizations using references to external sources of content. For illustrative purposes, the following description may refer to elements mentioned above in connection with FIG. 1. In this regard, while portions of the visualization process 200 may be performed by different elements of the computing system 100, for purposes of explanation, the subject matter is described herein in the context of the visualization process 200 being primarily performed by the application platform 124 and/or word processing application 126 that are implemented or executed by the processing system 120 at the document server 102. It should be appreciated that the visualization process 200 may include any number of additional or alternative tasks, the tasks need not be performed in the illustrated order and/or the tasks may be performed concurrently, and/or the visualization process 200 may be incorporated into a more comprehensive procedure or process having additional functionality not described in detail herein. Moreover, one or more of the tasks shown and described in the context of FIG. 2 could be omitted from a practical embodiment of the visualization process 200 as long as the intended overall functionality remains intact.

For purposes of explanation, the resource visualization process 200 will be described primarily in the context of the computing system of FIG. 1 with the resource being realized as a document that references an object residing at or a location associated with a database other than the document database. That said, the resource visualization process 200 is not necessarily limited to documents or references to database objects, and could be implemented in an equivalent manner for other types of files or resources to incorporate or integrate any type of external content into the visualization of the resource content.

Referring to FIG. 2, and with continued reference to FIG. 1, the visualization process 200 begins by retrieving or otherwise obtaining the content associated with a resource to be presented from the resource database and identifying a reference to content residing at an external source within the resource content (tasks 202, 204). For example, a user of the client device 106 may utilize the application platform 124 and/or the word processing application 126 to select or otherwise indicate a document 105 in the document database 104 for presentation. In response, the application platform 124 and/or the word processing application 126 queries or otherwise accesses the document database 104 to retrieve the text or other content corresponding to the body of the document 105 from the document database 104. Thereafter, the word processing application 126 analyzes the retrieved document content to detect or identify a reference 115 to a location associated with an external source 110 within the document content. For example, the word processing application 126 may scan or otherwise parse the document content to identify query statements, links, network addresses, or other encoded text within the body of the document that is marked up or tagged in a manner that designates or distinguishes that encoded text as a reference to an external source 110 rather than the normal or unformatted text of the document.

The visualization process 200 continues by retrieving or otherwise obtaining the referenced content from the external source (task 206). The application platform 124 and/or the word processing application 126 utilizes the referenced location 115 from within the document 105 to identify the database system 110 and/or the application server 112 as the host location for the external content to be incorporated into the document 105 and interact with the application platform 116 to query the database 114 to retrieve content for integration into the document 105 from the referenced location of a database object 118. For example, the application platform 124 and/or the word processing application 126 may obtain login credentials or other authentication information associated with the user of the client device 106 or the creator or owner of the document 105 (either from the user at the client device 106 or from the database 104) and provide the authentication information to the application platform 116 along with the referenced location 115 (or a query statement generated based thereon) via the network 103. The application platform 116 may then utilize the information received from the application platform 124 and/or the word processing application 126 to authenticate and execute a query to retrieve data from the referenced location of the database object 118, and then provide the data retrieved from those fields of the database object 118 to the application platform 124 and/or the word processing application 126 via the network 103.

After retrieving the referenced content from the external source, the visualization process 200 continues by generating or otherwise providing a graphical representation of the resource content at the client device that includes the referenced content retrieved from the external source at a location within the resource content corresponding to the location of the reference within the resource content (task 208). For example, the word processing application 126 may generate or otherwise provide a word processor GUI display within the client application 107 at the client device 106 that includes a graphical representation of the text or other content retrieved from the document database 104 (e.g., the "local" document content) that corresponds to or is otherwise associated with the particular page(s) of document 105 depicted within the word processor GUI display. The word processing application 126 generates or otherwise provides a graphical representation of the text, data, or other content retrieved from the database object 118 in the database system 110 (e.g., the "external" document content) within the displayed local document content. In this regard, the external document content is positioned within the displayed local document content on the appropriate page of the document 105 and at the appropriate location within the surrounding local document content on that page that corresponds to where the referenced location 115 is provided within the local document content for that page. Thus, the embedded reference 115 effectively incorporates by reference the content from the external source 110 within the local document content. In this regard, in some embodiments, the content from the external source 110 is presented using the same formatting in which it is stored or otherwise provided by the external source 110.

In some embodiments, the application platform 124 and/or the word processing application 126 also stores or otherwise maintains a particular instance of the resulting displayed document that includes the external document content as a particular version of the document 105. For example, each time an instance of the document 105 is generated by the word processing application 126 retrieving data from the external source 110, the word processing application 126 may create a corresponding version of that document 105 associated with that instance of retrieving external document content. Thus, every time an update occurs with respect to either the document 105 or the referenced data at the external source 110, a new version of the document 105 can be created (e.g., for comparisons, reversions, and the like). That said, in other embodiments, the word processing application 126 may forego maintaining different versions of the document 105 and generate the document 105 in real-time or on-demand as needed.

Still referring to FIG. 2, the illustrated visualization process 200 continues by updating or otherwise modifying the visualization of the resource to reflect changes to the external content residing at the reference location (task 210). In this regard, when the text, values, or other data of a field of a database object 118 corresponding to the referenced location 115 changes, the graphical representation of the external document content within the word processing GUI display at the client device 106 may be dynamically updated within the local document content to reflect the more recent information at the database system 110.

For example, in one embodiment, the word processing application 126 periodically polls the application platform 116 while the external document content is being presented within the word processing GUI display or when scrolling the document in a manner that would cause the external document content to change positions within the word processing GUI display to determine whether the data at the referenced location 115 has changed. In response to identifying a change at the referenced location of the database object 118, the word processing application 126 may reinitiate the application platform 116 querying the database 114 to retrieve the updated data from the database object 118 (e.g., task 206) and then dynamically update the external document content within the word processor GUI display to reflect the updated data, for example, by depicting a graphical representation of the updated data in lieu of the previously depicted external document content. In another embodiment, the word processing application 126 polls the application platform 116 in response to a user manually initiating a refresh of the document 105. In yet other embodiments, the database system application platform 116 may automatically push notifications or updated data to the word processing application 126. Thus, the word processing application 126 and/or the visualization process 200 is configurable to enable dynamically updating external document content substantially in real-time, by pushing notifications or updates to the word processing application 126 or increasing the frequency at which the word processing application 126 polls the database system 110. Accordingly, as described above, a user of another client device 108 can modify data associated with the database object 118 using the application platform 116, and have the modification to the data propagated to the word processing application 126, and thereby, to the word processor GUI display substantially in real-time.

Figure 3:
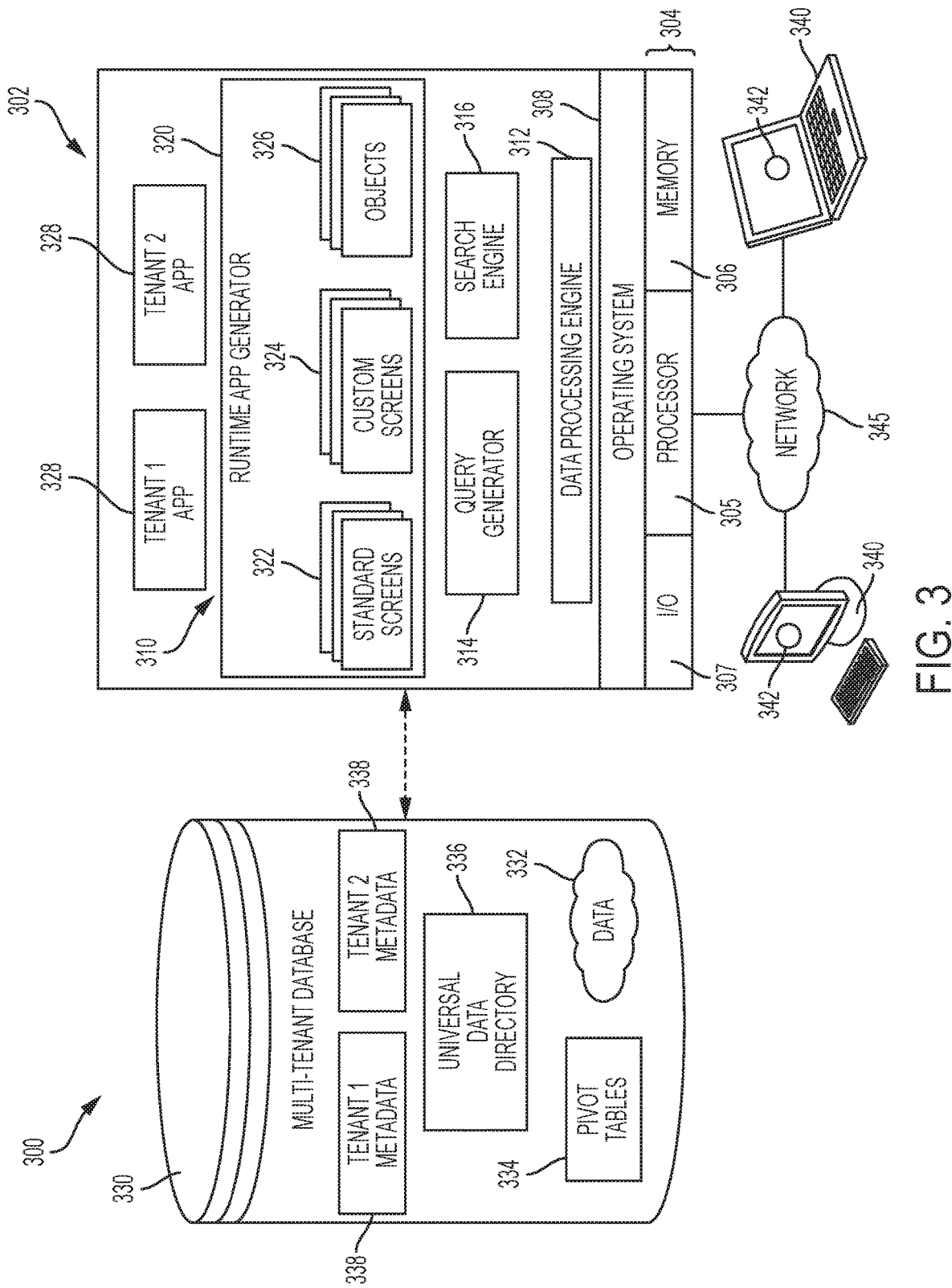
FIG. 3 is a block diagram of an exemplary multi-tenant system suitable for use with the computing system of FIG. 1 implementing the visualization process of FIG. 2 in accordance with one or more embodiments.

FIG. 3 depicts an exemplary embodiment of an on-demand multi-tenant database system 300 suitable for use in the computing system 100 of FIG. 1 in conjunction with the visualization process 200 of FIG. 2. For example, the external source 110 could be realized as the on-demand multi-tenant database system 300, with the external document content being data 332 retrieved from the database 330 (e.g., database 114) via the application platform 310 (e.g., application platform 116) provided by the server 302 (e.g., application server 112). In various embodiments, the document management system 101 could similarly be realized an on-demand multi-tenant database system 300, with the server 302 (e.g., document server 102) supporting an on-demand multi-tenant document database 330 (e.g., document database 104).

The illustrated multi-tenant system 300 of FIG. 3 includes a server 302 (e.g., application server 112) that dynamically creates and supports virtual applications 328 based upon data 332 from a common database 330 (e.g., database 114) that is shared between multiple tenants, alternatively referred to herein as a multi-tenant database. Data and services generated by the virtual applications 328 are provided via a network 345 (e.g., network 103) to any number of client devices 340 (e.g., client device 108), as desired. Each virtual application 328 is suitably generated at run-time (or on-demand) using a common application platform 310 (e.g., application platform 116) that securely provides access to the data 332 in the database 330 for each of the various tenants subscribing to the multi-tenant system 300. In accordance with one non-limiting example, the multi-tenant system 300 is implemented in the form of an on-demand multi-tenant customer relationship management (CRM) system that can support any number of authenticated users of multiple tenants.

As used herein, a "tenant" should be understood as referring to a group of one or more users that shares access to common subset of the data within the multi-tenant database 330. In this regard, each tenant includes one or more users associated with, assigned to, or otherwise belonging to that respective tenant. To put it another way, each respective user within the multi-tenant system 300 is associated with, assigned to, or otherwise belongs to a particular tenant of the plurality of tenants supported by the multi-tenant system 300. Tenants may represent customers, customer departments, business or legal organizations, and/or any other entities that maintain data for particular sets of users within the multi-tenant system 300 (i.e., in the multi-tenant database 330). For example, the application server 302 may be associated with one or more tenants supported by the multi-tenant system 300. Although multiple tenants may share access to the server 302 and the database 330, the particular data and services provided from the server 302 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 332 belonging to or otherwise associated with other tenants.

The multi-tenant database 330 is any sort of repository or other data storage system capable of storing and managing the data 332 associated with any number of tenants. The database 330 may be implemented using any type of conventional database server hardware. In various embodiments, the database 330 shares processing hardware 304 with the server 302. In other embodiments, the database 330 is implemented using separate physical and/or virtual database server hardware that communicates with the server 302 to perform the various functions described herein. In an exemplary embodiment, the database 330 includes a database management system or other equivalent software capable of determining an optimal query plan for retrieving and providing a particular subset of the data 332 to an instance of virtual application 328 in response to a query initiated or otherwise provided by a virtual application 328. The multi-tenant database 330 may alternatively be referred to herein as an on-demand database, in that the multi-tenant database 330 provides (or is available to provide) data at run-time to on-demand virtual applications 328 generated by the application platform 310.

In practice, the data 332 may be organized and formatted in any manner to support the application platform 310. In various embodiments, the data 332 is suitably organized into a relatively small number of large data tables to maintain a semi-amorphous "heap"-type format. The data 332 can then be organized as needed for a particular virtual application 328. In various embodiments, conventional data relationships are established using any number of pivot tables 334 that establish indexing, uniqueness, relationships between entities, and/or other aspects of conventional database organization as desired. Further data manipulation and report formatting is generally performed at run-time using a variety of metadata constructs. Metadata within a universal data directory (UDD) 336, for example, can be used to describe any number of forms, reports, workflows, user access privileges, business logic and other constructs that are common to multiple tenants. Tenant-specific formatting, functions and other constructs may be maintained as tenant-specific metadata 338 for each tenant, as desired. Rather than forcing the data 332 into an inflexible global structure that is common to all tenants and applications, the database 330 is organized to be relatively amorphous, with the pivot tables 334 and the metadata 338 providing additional structure on an as-needed basis. To that end, the application platform 310 suitably uses the pivot tables 334 and/or the metadata 338 to generate "virtual" components of the virtual applications 328 to logically obtain, process, and present the relatively amorphous data 332 from the database 330.

Still referring to FIG. 3, the server 302 is implemented using one or more actual and/or virtual computing systems that collectively provide the dynamic application platform 310 for generating the virtual applications 328. For example, the server 302 may be implemented using a cluster of actual and/or virtual servers operating in conjunction with each other, typically in association with conventional network communications, cluster management, load balancing and other features as appropriate. The server 302 operates with any sort of conventional processing hardware 304, such as a processor 305, memory 306, input/output features 307 and the like. The input/output features 307 generally represent the interface(s) to networks (e.g., to the network 345, or any other local area, wide area or other network), mass storage, display devices, data entry devices and/or the like. The processor 305 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 306 represents any non-transitory short or long term storage or other computer-readable media capable of storing programming instructions for execution on the processor 305, including any sort of random access memory (RAM), read only memory (ROM), flash memory, magnetic or optical mass storage, and/or the like. The computer-executable programming instructions, when read and executed by the server 302 and/or processor 305, cause the server 302 and/or processor 305 to create, generate, or otherwise facilitate the application platform 310 and/or virtual applications 328 and perform one or more additional tasks, operations, functions, and/or processes described herein. It should be noted that the memory 306 represents one suitable implementation of such computer-readable media, and alternatively or additionally, the server 302 could receive and cooperate with external computer-readable media that is realized as a portable or mobile component or application platform, e.g., a portable hard drive, a USB flash drive, an optical disc, or the like.

The application platform 310 is any sort of software application or other data processing engine that generates the virtual applications 328 that provide data and/or services to the client devices 340. In a typical embodiment, the application platform 310 gains access to processing resources, communications interfaces and other features of the processing hardware 304 using any sort of conventional or proprietary operating system 308. The virtual applications 328 are typically generated at run-time in response to input received from the client devices 340. For the illustrated embodiment, the application platform 310 includes a bulk data processing engine 312, a query generator 314, a search engine 316 that provides text indexing and other search functionality, and a runtime application generator 320. Each of these features may be implemented as a separate process or other module, and many equivalent embodiments could include different and/or additional features, components or other modules as desired.

The runtime application generator 320 dynamically builds and executes the virtual applications 328 in response to specific requests received from the client devices 340. The virtual applications 328 are typically constructed in accordance with the tenant-specific metadata 338, which describes the particular tables, reports, interfaces and/or other features of the particular application 328. In various embodiments, each virtual application 328 generates dynamic web content that can be served to a browser or other client program 342 associated with its client device 340, as appropriate.

The runtime application generator 320 suitably interacts with the query generator 314 to efficiently obtain multi-tenant data 332 from the database 330 as needed in response to input queries initiated or otherwise provided by users of the client devices 340. In a typical embodiment, the query generator 314 considers the identity of the user requesting a particular function (along with the user's associated tenant), and then builds and executes queries to the database 330 using system-wide metadata 336, tenant specific metadata 338, pivot tables 334, and/or any other available resources. The query generator 314 in this example therefore maintains security of the common database 330 by ensuring that queries are consistent with access privileges granted to the user and/or tenant that initiated the request. In this manner, the query generator 314 suitably obtains requested subsets of data 332 accessible to a user and/or tenant from the database 330 as needed to populate the tables, reports or other features of the particular virtual application 328 for that user and/or tenant.

Still referring to FIG. 3, the data processing engine 312 performs bulk processing operations on the data 332 such as uploads or downloads, updates, online transaction processing, and/or the like. In many embodiments, less urgent bulk processing of the data 332 can be scheduled to occur as processing resources become available, thereby giving priority to more urgent data processing by the query generator 314, the search engine 316, the virtual applications 328, etc.

In exemplary embodiments, the application platform 310 is utilized to create and/or generate data-driven virtual applications 328 for the tenants that they support. Such virtual applications 328 may make use of interface features such as custom (or tenant-specific) screens 324, standard (or universal) screens 322 or the like. Any number of custom and/or standard objects 326 may also be available for integration into tenant-developed virtual applications 328. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 326 such as "account" objects, "opportunity" objects, "contact" objects, or the like. The data 332 associated with each virtual application 328 is provided to the database 330, as appropriate, and stored until it is requested or is otherwise needed, along with the metadata 338 that describes the particular features (e.g., reports, tables, functions, objects, fields, formulas, code, etc.) of that particular virtual application 328. For example, a virtual application 328 may include a number of objects 326 accessible to a tenant, wherein for each object 326 accessible to the tenant, information pertaining to its object type along with values for various fields associated with that respective object type are maintained as metadata 338 in the database 330. In this regard, the object type defines the structure (e.g., the formatting, functions and other constructs) of each respective object 326 and the various fields associated therewith.

Still referring to FIG. 3, the data and services provided by the server 302 can be retrieved using any sort of personal computer, mobile telephone, tablet or other network-enabled client device 340 on the network 345. In an exemplary embodiment, the client device 340 includes a display device, such as a monitor, screen, or another conventional electronic display capable of graphically presenting data and/or information retrieved from the multi-tenant database 330. Typically, the user operates a conventional browser application or other client program 342 (e.g., client application 107) executed by the client device 340 to contact the server 302 via the network 345 using a networking protocol, such as the hypertext transport protocol (HTTP) or the like. The user typically authenticates his or her identity to the server 302 to obtain a session identifier ("SessionID") that identifies the user in subsequent communications with the server 302. When the identified user requests access to a virtual application 328, the runtime application generator 320 suitably creates the application at run time based upon the metadata 338, as appropriate. As noted above, the virtual application 328 may contain Java, ActiveX, or other content that can be presented using conventional client software running on the client device 340; other embodiments may simply provide dynamic web or other content that can be presented and viewed by the user, as desired.

Referring again to FIGS. 1-2 with reference to FIG. 3, in one or more exemplary embodiments, the server 302 and/or the application platform 310 supports the visualization process 200 to allow the word processing application 126 to provide authentication information and additional information corresponding to the referenced location 115 that allows the application platform 310 to authenticate and execute a query to retrieve the field(s) of data 332 associated with an object 328 corresponding to the referenced location 115 from the database 330 and provide the resulting data back to the word processing application 126 via the network 345. The word processing application 126 then generates a graphical representation of the external document content retrieved from the database 330 within a word processor GUI display at the client device 106, as described above.

In one embodiment, the retrieved external data is realized as a field of data 332 associated with an instance of an object 328 that is automatically generated or created by the application platform 310 based on one or more other fields of data 332 associated with that object 328. For example, the referenced location 115 could refer to a field for autogenerated text that summarizes or characterizes the values of other fields of that object 328. As another example, the referenced location 115 could refer to a field for a chart, report, or other graphic that is automatically generated by the application platform 310 based on the values of other fields of that object 328. Thus, a document 105 hosted by the document management system 101 could incorporate auto-generated summaries or reports of data maintained at another database system 110, 300 that are automatically generated by that database system 110, 300, and which can also be dynamically updated as described above (e.g., task 210). Accordingly, users can incorporate automatically generated and up-to-date or real-time summaries of external database data within documents 105 without having to manually update the summarizing text, transpose data, and/or the like.

Still referring to FIGS. 1-2 and 3, while the subject matter is described above in the context of documents, it should be readily apparent how the subject matter can be implemented in an equivalent manner for other types of electronic files or resources. For example, a cell of a spreadsheet file in a resource database 104 could reference 115 a field of database object 118, with a spreadsheet application provided by the application platform 124 retrieving the value, formula, or other data for that cell from that referenced field 115 of the database object 118 via the network 103 and application server 112 and providing a graphical representation of the retrieved external data within that cell of the spreadsheet on a spreadsheet GUI display at the client device 106.

Figure 4:
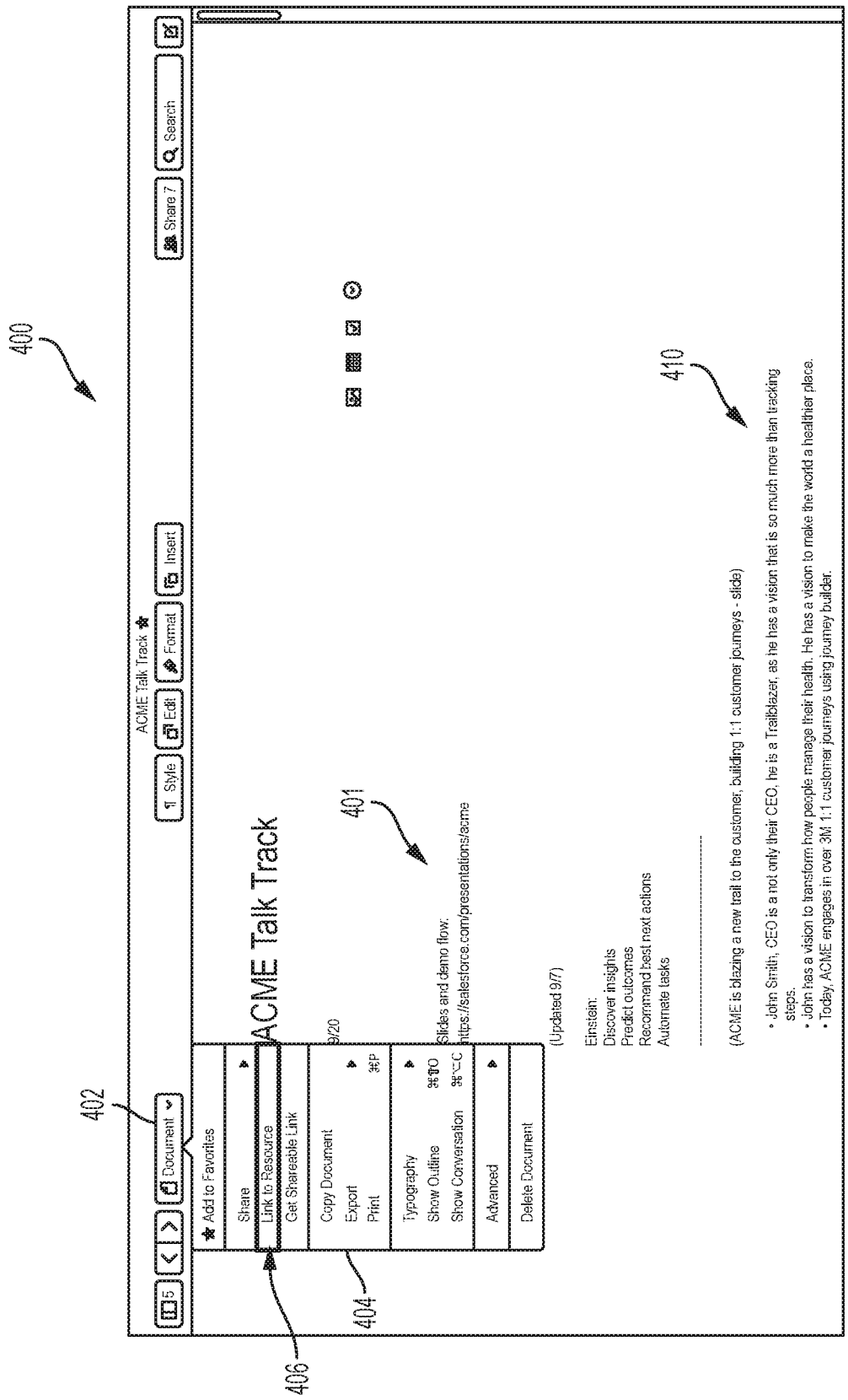

FIGS. 4-8 depict an exemplary sequence of GUI displays illustrating mapping between documents or database objects and the resulting incorporation of data or information residing at a mapped location into a graphical representation of an electronic file at a location that corresponds to the mapping. FIG. 4 depicts a word processing GUI display 400 that may be provided by a resource visualization application 126 to create and edit the content of documents within an editor region 401. The word processing GUI display 400 includes a selectable GUI element 402, such as a button, that when selected, results in a context menu, list, pop-up window, or similar GUI element 404 being presented overlying the editor region 401. The context menu 404 includes an entry or element 406 that is selectable by the user to establish mapping between resources.

Figure 5:
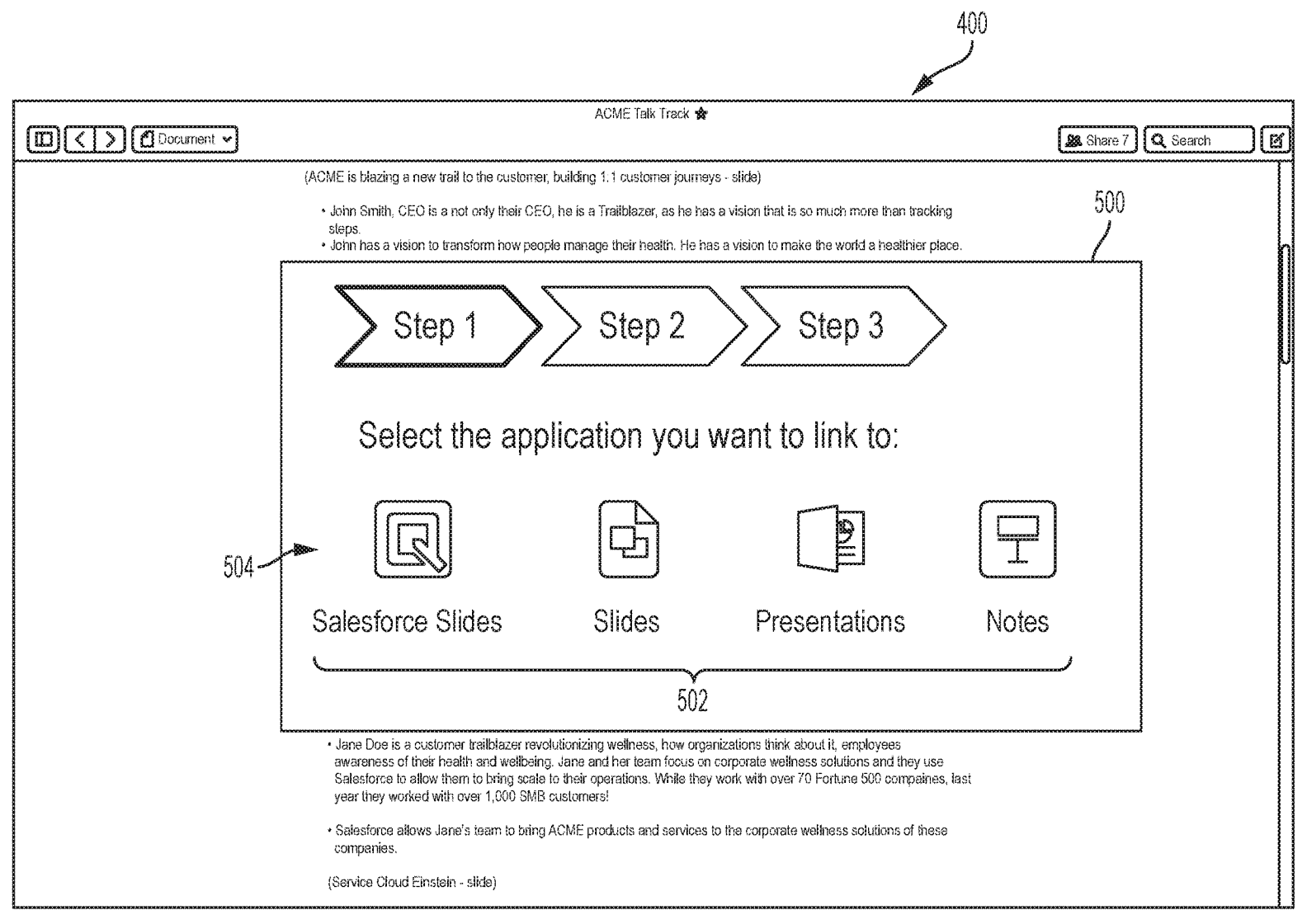

Referring now to FIG. 5, in response to selection of the reference element 406 from the context menu 404, the application platform 124 updates the word processing GUI display 400 by generating or otherwise providing a pop-up window 500 or similar GUI display overlay that includes a menu or listing 502 of icons or similar GUI elements corresponding to sources (e.g., external sources 110) that may be mapped, linked, or otherwise referenced with the document presented in the editor region 401. Referring to FIG. 6, in response to selection of a particular source icon 504, the application platform 124 updates the window 500 to include a menu or listing 600 of the documents, database objects, or resources at that selected source capable of being mapped, linked, or otherwise referenced to the current document.

Figure 7:
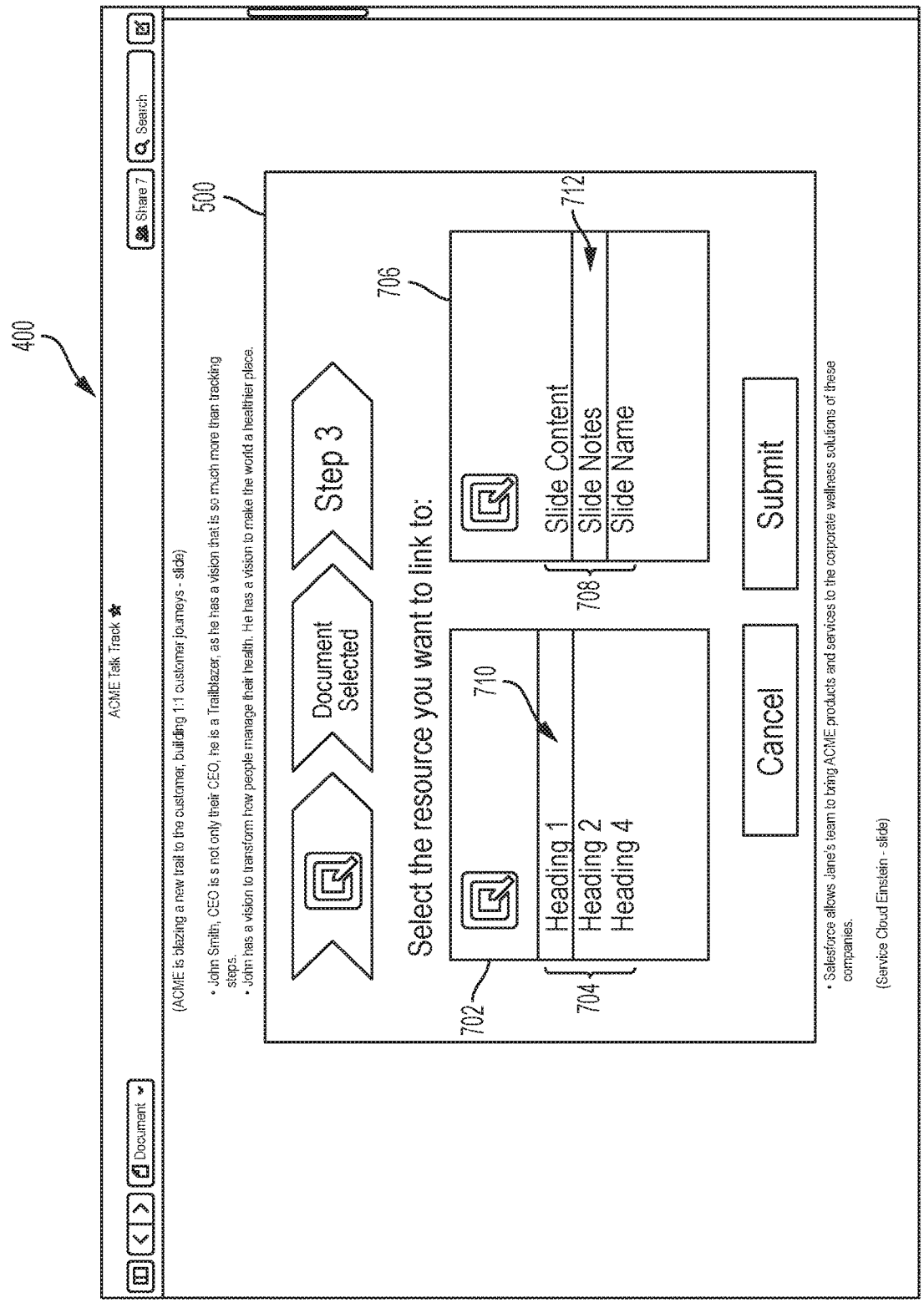

Referring now to FIG. 7, in the illustrated embodiment, after selection or indication of the external resource to be mapped, linked, or referenced with the current resource, the application platform 124 updates the window 500 to include a first region 702 corresponding to the current resource being edited within the GUI display 400 and a second region 706 corresponding to the selected resource from within the list 600. In this regard, the first region 702 includes a list 704 of the fields of the current resource that may be selected or otherwise identified by the user for mapping, while the second region 706 includes a list 708 of the fields of the selected external resource that may be selected or otherwise identified by the user for mapping. In this regard, a selected field 710 of the current resource may be updated to include an embedded reference to a selected field 712 of the external resource, or vice versa, to thereby incorporate the data or information stored or maintained in the selected field 712 of the external resource into the selected field 710 of the current resource, or vice versa. For example, in one embodiment, selected "Slide Notes" field of a presentation file may be modified to include an embedded reference to the selected "Heading 1" field or portion of the current document, to thereby insert or otherwise incorporate the text associated with the selected "Heading 1" field or portion of the current document into the "Slide Notes" of the presentation file. Conversely, the "Slide Notes" field of the presentation file may be inserted or otherwise incorporated into the "Heading 1" field or portion of the document file.

Figure 8:
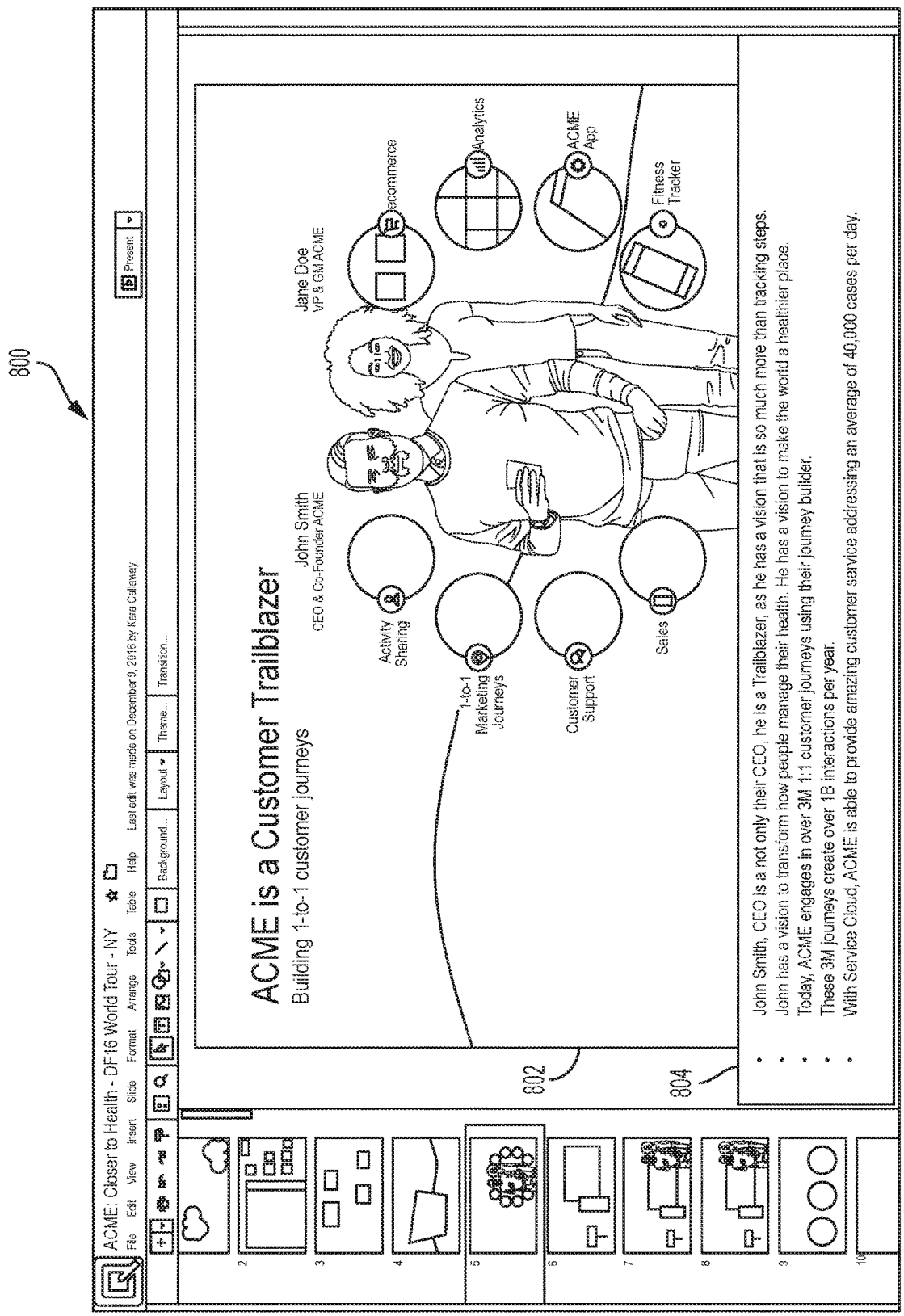

Referring now to FIG. 8 with reference to FIGS. 1-2 and 4-7, in one embodiment, the application platform 124 and/or resource visualization application 126 generates or otherwise provides a GUI display 800 of a resource 105 (e.g., a presentation file) that includes an embedded reference 115 to a field of a document file stored as a database object 118 in a database 114 associated with an external source 110, which corresponds to the sequence of GUI displays of FIGS. 4-7. In this regard, the application platform 124 and/or resource visualization application 126 accesses the resource database 104 to retrieve the presentation file 105 from the database 104 and then generates or otherwise provides a graphical representations of one or more of the slides associated with the presentation file 105 and the corresponding slide notes or other content associated with the presentation file 105.

When a graphical representation of a particular slide 802 is presented, the application platform 124 and/or resource visualization application 126 may also access the slide notes field corresponding to that slide to generate or otherwise provide a concurrent graphical representation of the notes associated with the displayed slide 802. In this regard, when the application platform 124 and/or resource visualization application 126 identifies an embedded reference 115 to the Heading 1 field of the document database object 118, the application platform 124 and/or resource visualization application 126 transmits or otherwise provides a query statement (or corresponding instructions) to the application server 112 to retrieve the text associated with the Heading 1 field of the document database object 118 from the database 114. In response to receiving the text 410 associated with the Heading 1 field of the document database object 118, the application platform 124 and/or resource visualization application 126 generates or otherwise provides a graphical representation 804 of the slide notes associated with the currently displayed slide 802 within the GUI display 800. The content of the displayed slide note 804 thereby corresponds to the text 410 of the referenced field 115 of the external document database object 118, and thus, the displayed slide note 804 may be updated in response to changes to the text 410 of the referenced field 115 of the external document database object 118.

It should be noted that in embodiments that support bidirectional mapping or synchronization between resources, in response to a user modifying the text of the displayed slide note 804 within the GUI display 800, the referenced field 115 of the external document database object 118 may be updated or modified to reflect the updated text of the slide note 804. For example, the text 410 of the Heading 1 field of the external document database object 118 may be overwritten or otherwise modified to correspond to the displayed slide note 804 in response to changes to the content of the displayed slide note 804. In such embodiments, in response to a user editing or modifying the displayed slide note 804, the application platform 124 and/or resource visualization application 126 may identify the markup or embedded reference 115 associated with that field of the presentation file 105, and then utilize the embedded reference 115 to propagate updates to that field of the presentation file 105 to the external document database object 118 mapped therewith. For example, the application platform 124 and/or resource visualization application 126 may transmit or otherwise provide instructions to the application server 112 to store, write, or otherwise maintain updated content contained within the displayed slide note 804 at the referenced Heading 1 field of the document database object 118 in the database 114 in lieu of the original or preceding value for the Heading 1 field. Thus, fields of different resources may be mapped to one another and dynamically updated in real-time in a bidirectional manner to thereby synchronize content across different resources, applications, platforms, etc. In other embodiments, the Heading 1 field of the document database object 118 include or otherwise be associated with an embedded reference to the slide notes 804 associated with slide 802 of the presentation file 105, such that the document is dynamically updated to reflect the current state of the slide notes 804 of the presentation file 105 upon the next opening or visualization of the document database object 118.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to querying and other database functions, multi-tenancy, cloud computing, on-demand applications, querying, hyperlinks, word processing, spreadsheets, hosting, management and/or sharing of documents or other files, versioning, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of visualizing resources maintained at a resource management system comprising a resource server and a resource database, the method comprising:
    obtaining, by the resource server, an electronic file from the resource database;
    identifying, by the resource server, an embedded reference corresponding to a field of a database object at a database system within a body of the electronic file by analyzing the body of the electronic file to identify a query statement for the field of the database object, wherein the database system is communicatively coupled to the resource server over a network;
    initiating, by the resource server, a query for the field of the database object via a server of the database system using the query statement to retrieve first data residing at the database system; and
    generating, by the resource server, a graphical representation of the body of the electronic file within an application at a client device communicatively coupled to the network, wherein:
        the graphical representation of the body of the electronic file includes a graphical representation of the first data at a location within the graphical representation of the body of the electronic file corresponding to a location of the embedded reference within the body of the electronic file;
        the graphical representation of the first data comprises a graphic that is automatically generated at the database system based on values of other fields of the database object; and
        the graphical representation of the first data is dynamically updated in response to an update at the database system.

2. The method of claim 1, further comprising the resource server polling the database system to identify the update to the first data.

3. The method of claim 1, further comprising the resource server receiving a notification of the update from the database system.

4. The method of claim 1, further comprising syncing the graphical representation of the first data to a referenced location at the database system corresponding to the embedded reference.

5. The method of claim 1, wherein:
    retrieving the first data comprises retrieving autogenerated content from the external source; and
    the graphical representation of the first data comprises the autogenerated content.

6. A computer-readable medium having instructions stored thereon that are executable by a processing system of the resource server to perform the method of claim 1.

7. A method comprising:
    obtaining, by a document server, a document from a document database;
    identifying, by the document server, an embedded reference corresponding to a field of a database object at a database system within a body of the document by analyzing text corresponding to the body of the document to identify a query statement for the field of the database object within the text, the database system being communicatively coupled to the document server over a network;
    initiating, by the document server over the network, a query for the field of the database object via a server of the database system using the query statement to retrieve first data from the database system using the embedded reference;
    generating, by the document server, a graphical representation of the document at a client device communicatively coupled to the network, wherein the graphical representation of the document includes a graphical representation of the first data at a location within the graphical representation of the document corresponding to a location of the embedded reference within the body of the document and the graphical representation of the first data comprises a graphic that is automatically generated at the database system based on values of other fields of the database object; and dynamically updating, by the document server, the graphical representation of the first data at the location within the graphical representation of the document after an update to the first data at the database system.

8. The method of claim 7, further comprising providing, by the document server, a word processing application including a word processor graphical user interface (GUI) display at the client device, wherein:
generating the graphical representation of the document comprises depicting one or more pages of the document within the word processor GUI display; and
the graphical representation of the first data is depicted at the location on a first page of the one or more pages corresponding to the location of the embedded reference within the body of the document.

9. The method of claim 7, wherein dynamically updating the graphical representation of the first data comprises syncing the graphical representation of the document with a referenced location at the database system corresponding to the embedded reference.

10. The method of claim 7, wherein the graphical representation of the document comprises text associated with one or more pages of the document depicted within a word processor graphical user interface (GUI) display at the client device, wherein the graphical representation of the first data is depicted within a subset of the text corresponding to a page of the one or more pages at the location on the page corresponding to the location of the embedded reference within the subset of the text.

11. The method of claim 10, the embedded reference corresponding to a summary field of the database object at the database system, wherein retrieving the first data comprises the document server obtaining data associated with the summary field of the database object from the database system.

12. The method of claim 11, wherein the first data comprises autogenerated text based on one or more additional fields of the database object.

13. The method of claim 11, wherein the first data comprises a report or chart based on one or more additional fields of the database object.

14. A computing system comprising:
a resource database to maintain data associated with an electronic file, wherein the data includes an embedded reference within a body of the electronic file, the embedded reference corresponding to a field of a database object at a database system on a network; and
a resource server coupled to the resource database and the network to identify the embedded reference at a location within the body of the electronic file by analyzing the body of the electronic file to identify a query statement for the field of the database object, initiate a query for the field of the database object via a server of the database system using the query statement to retrieve external data from the database system on the network using the embedded reference, and generate a graphical representation of the electronic file at a client device based at least in part on the data, wherein the graphical representation of the electronic file includes a graphical representation of the external data at the location within a graphical representation of the data corresponding to a location of the embedded reference within a body of the electronic file, the graphical representation of the external data comprises a graphic that is automatically generated at the database system based on values of other fields of the database object, and the graphical representation of the external data is dynamically updated in response to an update at the database system.

15. The computing system of claim 14, wherein the electronic file comprises an electronic document file and the data comprises text corresponding to a body of a document corresponding to the electronic document file.

16. The computing system of claim 15, wherein the database system comprises:
a second database including an object having one or more fields associated therewith; and
an application server coupled to the second database and the network, wherein:
the external location comprises a field of the object; and
the resource server retrieves the external data by initiating a query for the field of the object at the application server.

17. The method of claim 1, further comprising the resource server providing instructions to the database system to store updated content at a location corresponding to the embedded reference in response to a user modifying the graphical representation of the first data at the client device.

* * * * *